(12) United States Patent
Cherian et al.

(10) Patent No.: US 8,401,709 B2
(45) Date of Patent: Mar. 19, 2013

(54) DYNAMIC DISTRIBUTED POWER GRID CONTROL SYSTEM

(75) Inventors: Sunil Cherian, Fort Collins, CO (US); Brendan Keogh, Fort Collins, CO (US); Oliver Pacific, Katy, TX (US)

(73) Assignee: SPIRAE, Inc., Fort Collins, CO (US)

( * ) Notice: Subject to any disclaimer, the term of this patent is extended or adjusted under 35 U.S.C. 154(b) by 294 days.

(21) Appl. No.: 12/846,520

(22) Filed: Jul. 29, 2010

(65) Prior Publication Data

US 2011/0106321 A1 May 5, 2011

Related U.S. Application Data

(60) Provisional application No. 61/257,834, filed on Nov. 3, 2009.

(51) Int. Cl.
*G06F 19/00* (2011.01)
(52) U.S. Cl. ........................ 700/291; 700/295
(58) Field of Classification Search .................. 700/291, 700/295
See application file for complete search history.

(56) References Cited

U.S. PATENT DOCUMENTS

| | | | |
|---|---|---|---|
| 7,398,194 B2 * | 7/2008 | Evans et al. ...................... 703/18 |
| 7,747,739 B2 * | 6/2010 | Bridges et al. ................. 709/224 |
| 7,844,370 B2 * | 11/2010 | Pollack et al. ................. 700/291 |
| 2003/0055677 A1 * | 3/2003 | Brown et al. ...................... 705/1 |
| 2003/0212513 A1 | 11/2003 | Vandevanter et al. |
| 2007/0005315 A1 * | 1/2007 | Evans et al. ......................... 703/2 |
| 2007/0124026 A1 * | 5/2007 | Troxell et al. ................. 700/291 |
| 2007/0239373 A1 | 10/2007 | Nasle |
| 2007/0285079 A1 | 12/2007 | Nasle |
| 2008/0049013 A1 | 2/2008 | Nasle |
| 2008/0077368 A1 | 3/2008 | Nasle |
| 2008/0109205 A1 | 5/2008 | Nasle |
| 2008/0120080 A1 | 5/2008 | Nasle |
| 2008/0167844 A1 | 7/2008 | Nasle et al. |
| 2008/0262820 A1 | 10/2008 | Nasle |
| 2008/0263469 A1 | 10/2008 | Nasle et al. |
| 2009/0063132 A1 | 3/2009 | Miyazaki |
| 2009/0076749 A1 | 3/2009 | Nasle |
| 2009/0083019 A1 | 3/2009 | Nasle |
| 2009/0099832 A1 | 4/2009 | Nasle |
| 2009/0105998 A1 | 4/2009 | Radibratovic et al. |
| 2009/0228324 A1 * | 9/2009 | Ambrosio et al. ............... 705/10 |
| 2009/0319093 A1 | 12/2009 | Joos |
| 2010/0262411 A1 | 10/2010 | Nasle et al. |
| 2010/0268396 A1 | 10/2010 | Nasle et al. |
| 2011/0082596 A1 | 4/2011 | Meagher et al. |
| 2011/0082597 A1 | 4/2011 | Meagher |
| 2011/0093127 A1 | 4/2011 | Kaplan |

FOREIGN PATENT DOCUMENTS

WO    WO 03/073182    9/2003

* cited by examiner

*Primary Examiner* — Michael D Masinick
(74) *Attorney, Agent, or Firm* — Martensen IP; Michael C. Martensen

(57) ABSTRACT

A system for dynamically managing and controlling distributed energy resources in a transmission/distribution power grid is disclosed. A plurality of regions within a transmission/distribution power grid is autonomously managed using regional control modules. Each regional control module oversees the management and control of the transmission/distribution power grid and is further associated with a plurality of local control modules that interface with distributed energy resources within a region. Power production and power consumption are monitored and analyzed by the enterprise control module which, upon determining that power consumption within a region does not match power producing capability, dynamically reallocates distributed energy resources throughout the grid keeping the system balance. Power flow at key nodes within the network are monitored and analyzed by the local control modules, regional control modules, and enterprise control modules with compensating actions taken in the event that system parameter risks violating safety, stability, or operational thresholds.

41 Claims, 10 Drawing Sheets

DYNAMIC DISTRIBUTED POWER GRID CONTROL SYSTEM

RELATED APPLICATION

The present application relates to and claims the benefit of priority to U.S. Provisional Patent Application No. 61/257,834 filed Nov. 3, 2009 which is hereby incorporated by reference in its entirety for all purposes as if fully set forth herein.

BACKGROUND OF THE INVENTION

1. Field of the Invention

Embodiments of the present invention relate, in general, to power grids and more particularly to systems and methods for controlling allocation, production, and consumption of power in an electric power grid.

2. Relevant Background

An electrical grid is not a single entity but an aggregate of multiple networks and multiple power generation companies with multiple operators employing varying levels of communication and coordination, most of which are manually controlled. A smart grid increases connectivity, automation and coordination among power suppliers and power consumers and the networks that carry that power for performing either long-distance transmissions or local distribution.

Today's alternating current power grid was designed in the latter part of the 19th century. Many of the implementation decisions and assumptions that were made then are still in use today. For example, the current power grid includes a centralized unidirectional electric power transmission system that is demand driven. Over the past 50 years the electrical grid has not kept pace with modern challenges. Challenges such as security threats, national goals to employ alternative energy power generation, conservation goals, a need to control peak demand surges, uninterruptible demand of power, and new digital control devices put in question the ability of today's electrical distribution grid. To better understand the nature of these challenges, a firm grasp of current power generation and distribution is necessary.

The existing power grid starts at a power generation plant and thereafter distributes electricity through a variety of power transmission lines to the power consumer. The power producer or supplier in almost all cases consists of a spinning electrical generator. Sometimes the spinning generators are driven by a hydroelectric dam, large diesel engines or gas turbines, but in most cases the generator is powered by steam. The steam may be created by burning coal, oil, natural gas or in some cases a nuclear reactor. Electric power can also be produced by chemical reactions, direct conversion from sunlight and many other means.

The power produced by these generators is alternating current. Unlike direct current, alternating current oscillates much like a sine wave over a period of time. Alternating current (AC) operating as a single sine wave is called single phase power. Existing power plants and transmission lines carry three different phases of AC power simultaneously. Each of these phases are offset 120° from each other and each phase is distributed separately. As power is added to the grid, it must be synchronized with the existing phase of the particular transmission line it is utilizing.

As this three-phase power leaves the generator from a power station, it enters a transmission substation where the generated voltage is up-converted to an extremely high number for long-distance transmission. Then, upon reaching a regional distribution area, the high transmission voltage is stepped down to accommodate a local or regional distribution grid. This step down process may happen in several phases and usually occurs at a power substation.

FIG. 1 shows a typical power distribution grid as is known to one skilled in the art. As shown, three power generation plants 110 service three distinct and separate regions of power consumers 150. Each power plant 110 is coupled to its power consumer 150 via distribution lines 140. Interposed between the power producer 110 and the power consumer 150 are one or more transmission substations 125 and power sub-stations 130. FIG. 1 also shows that the power production plants are linked via high-voltage transmission lines 120.

From each power production plant 110, power is distributed to the transmission substation 125 and thereafter, stepped down to the power substations 130 which interfaces with a distribution bus, placing electricity on a standard line voltage of approximately 7200 volts. These power lines are commonly seen throughout neighborhoods across the world, and carry power to the end-user 150. Households and most businesses require only one of the three phases of power that are typically carried by the power lines. Before reaching each house, a distribution transformer reduces the 7200 volts down to approximately 240 volts and converts it to normal household electrical service.

The current power distribution system involves multiple entities. For example, production of power may represent one entity, while the long distance transmission of power another. Each of these companies interact with one or more distribution networks that ultimately deliver power to the power consumer. While the divisions of control described herein are not absolute, they nonetheless represent a hurdle for dynamic control of power over a distributed power grid.

Under the current power distribution grid, should the demand for power by a group of power consumers exceed the production capability of their associated power production facility, that facility can purchase excess power from other networked power producers. There is a limit to the distance power can be reliably and efficiently transported, thus as consumer demand increases, more regional power producers are required. The consumer has little control over who produces the power it consumes.

Electrical distribution grids of this type have been in existence and use for over 100 years. And while the overall concept has not significantly changed, it has been extremely reliable. However, it is becoming increasingly clear that the existing power grid is antiquated, and that new and innovative control systems are necessary to modify the means by which power is efficiently distributed from the producer to the consumer. For example, when consumer demand for power routinely exceeds the production capability of a local power production facility, the owner and operator of the local power network considers adding additional power production capability, or alternatively—, a portion of the consumers are denied service, i.e. brown-outs. To add additional power to the grid, a complicated and slow process is undertaken to understand and control new electrical power distribution options. The capability of the grid to handle the peak demands must be known and monitored to ensure safe operation of the grid, and, if necessary, additional infrastructure must be put in place. This process can take years and fails to consider the dynamic nature of electrical production and demand.

One aspect highlighting the need to modify existing power distribution control systems is the emergence of alternative and renewable power production sources, distributed storage systems, demand management systems, smart appliances, and intelligent devices for network management. These options each require active power management of the distribution network, substantially augmenting the control strategies that are currently utilized for distribution power network management.

Existing network management solutions lack the distributed intelligence to manage power flow across the network on a multitude of timescales. This void is especially evident, since new power generation assets being connected to the grid are typically owned by different organizations and can be used for delivering different benefits to different parties at different times. Conventional electric power system management tools are designed to operate network equipment and systems owned by the network operators themselves. They are not designed to enable dynamic transactions between end-users (power consumers), service providers, network operators, power producers, and other market participants.

Existing power grids were designed for one-way flow of electricity and if a local sub-network or region generates more power than it is consuming, the reverse flow of electricity can raise safety and reliability issues. A challenge, therefore, exists to dynamically manage power production assets in real time, and to enable dynamic transactions between various energy consumers, asset owners, service providers, market participants, and network operators. These and other challenges present in the current power distribution grid are addressed by one or more embodiments of the present invention.

SUMMARY OF THE INVENTION

A system for dynamic control and distribution of power over a distributed power grid is hereafter described by way of example. According to one embodiment of the present invention, a multi-layered control architecture is integrated into the existing power transmission and distribution grid, so as to enable dynamic management of power production, distribution, storage, and consumption (collectively distributed energy resources). This dynamic control is complemented by the ability to model proposed power distribution solutions prior to implementation, thereby validating that the proposed power distribution solution will operate within the existing infrastructure's physical and regulatory limitations.

According to one embodiment of the present invention, a distributed control system is interfaced with an existing power distribution grid to efficiently control power production and distribution. The distributed control system has three primary layers: i) enterprise control module, ii) regional control modules, and iii) local control modules. An enterprise control module is communicatively coupled to existing supervisory control and data acquisition systems, and to a plurality of regional control modules. The regional control modules are integrated into existing transmission sub-stations and distribution sub-stations to monitor and issue control signals to other devices or control modules to dynamically manage power flows on the grid. Each regional control module is further associated with a plurality of local control modules that interface with power producers, including steam driven electric generators, wind turbine farms, hydroelectric facilities and photoelectric (solar) arrays, storage resources such as thermal or electric storage devices and batteries on electric vehicles, and demand management systems or smart appliances Each local control module falls under the direction of a regional control module for management and control of its associated power producer, consumer, or device. By standardizing control responses, the regional control module is operable to manage power production, distribution, storage and consumption within its associated region. In another embodiment of the present invention, regional control modules, via the enterprise control module, can identify a request for additional power production. Knowing the production capability of other regional areas and whether they possess excess capacity, the enterprise control module can direct a different regional control module to increase power production to produce excess power or tap stored energy. The excess power can then be transmitted to the region in need of power for distribution.

According to another embodiment of the present invention, modifications to the power production and distribution system can be simulated in real time to determine whether a proposed solution to meet increased power consumption demands is within regulatory, safety guidelines and/or system capabilities. Upon validating that a proposed solution can be achieved, it can be implemented using real-time controls.

Another aspect of the present invention includes managing enterprise level power load demands, energy production and distribution across a power grid. As demand changes are driven by a plurality of power consumers, the enterprise control module can detect the need for additional power by one or more regional control modules. In addition, the enterprise control module can receive data regarding each regional control module's ability to produce excess power in relation to its local consumer demand. The enterprise control module can issue commands to one or more regional control modules to increase power production or decrease consumption as well as reroute excess power. Receiving such a command, the regional control modules communicate with the power producers within its region to increase power production. The command transmitted to each power producer is standardized to ensure consistent production response by the variety of power production options associated with a distributed power grid. The local control modules and the regional control modules are also capable of independently taking action to keep supply and demand in balance if very fast action is required to keep the system in a stable operating condition.

The present invention further possesses the ability to automatically respond to changes in network structure, asset availability, power generation levels, or load conditions without requiring any reprogramming. According to one embodiment of the present invention the enterprise control module as well as the regional and local control modules possess knowledge of known components of the distributed energy grid. As new components of a known class are connected to the grid, for example an additional wind turbine, the various layers of the present invention immediately recognized it as a wind turbine possessing particular characteristics and capabilities. Knowing these characteristics and capabilities the present invention can issue commands seamlessly with respect to the production or power and its distribution. Upon a command being issued the regional and local control modules can provide to each component the correct information such that it will be understood by that device and perform as expected. The present invention also possesses the capability to recognize components that are foreign to the distributed grid. Upon a unrecognized device being coupled to the grid, the local control module initiates an inquiry to identify that devices characteristics, properties, and capabilities. That information is added to the repository of information and is thereafter used to facilitate communication with and control of the device. This process may be manual or automatic.

The present invention further enables the enterprise control module to expose functional capabilities to other applications for implementing different types of services. Examples include a feeder peak load management application that uses an import/export function provided by the controller to limit the maximum load experienced by that feeder at the substation, and a reliability application that can issue an "island" command to a regional control module to separate from the grid and operate independently using local generation resources and load control. By using functional capabilities exposed by the enterprise control module, many applications can use power generating, consuming, and assets storing capabilities of the network without compromising its stability or violating operating limits.

The present invention provides method and systems to enable general transactions between different service providers and service subscribers automatically (dynamic transactions between power consumers, service providers, network operators, power producers, and other market participants), while maintaining the stability and reliability of grid operations. The multi-layered approach of the present invention provides a stable interface between applications which operate on the front end of the system and devices which interface with the back end. In doing so both applications and devices experience a "Plug an Play" experience which is capitalized upon to manage the distributed power grid. An example would be how a peak load management application automatically finds and uses available generators to ensure that a demand limit is not exceeded on a distribution feeder. This is analogous to a word processing application automatically finding an available network printer when needed.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 3A:
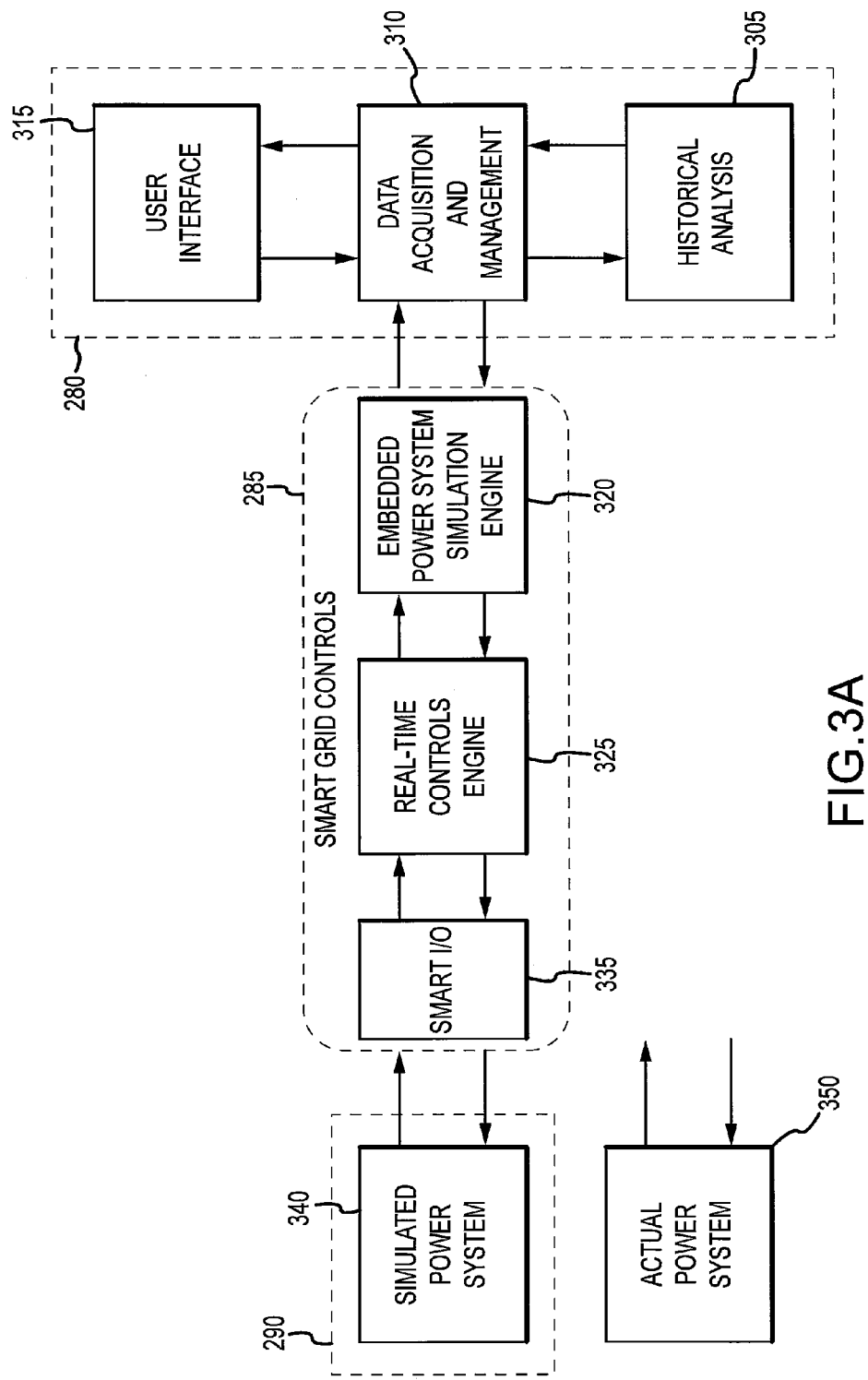
FIG. 3A is a high level block diagram showing a process flow for implementing distributed control methodology into a simulated power system according to one embodiment of the present invention.
Figure 3B:
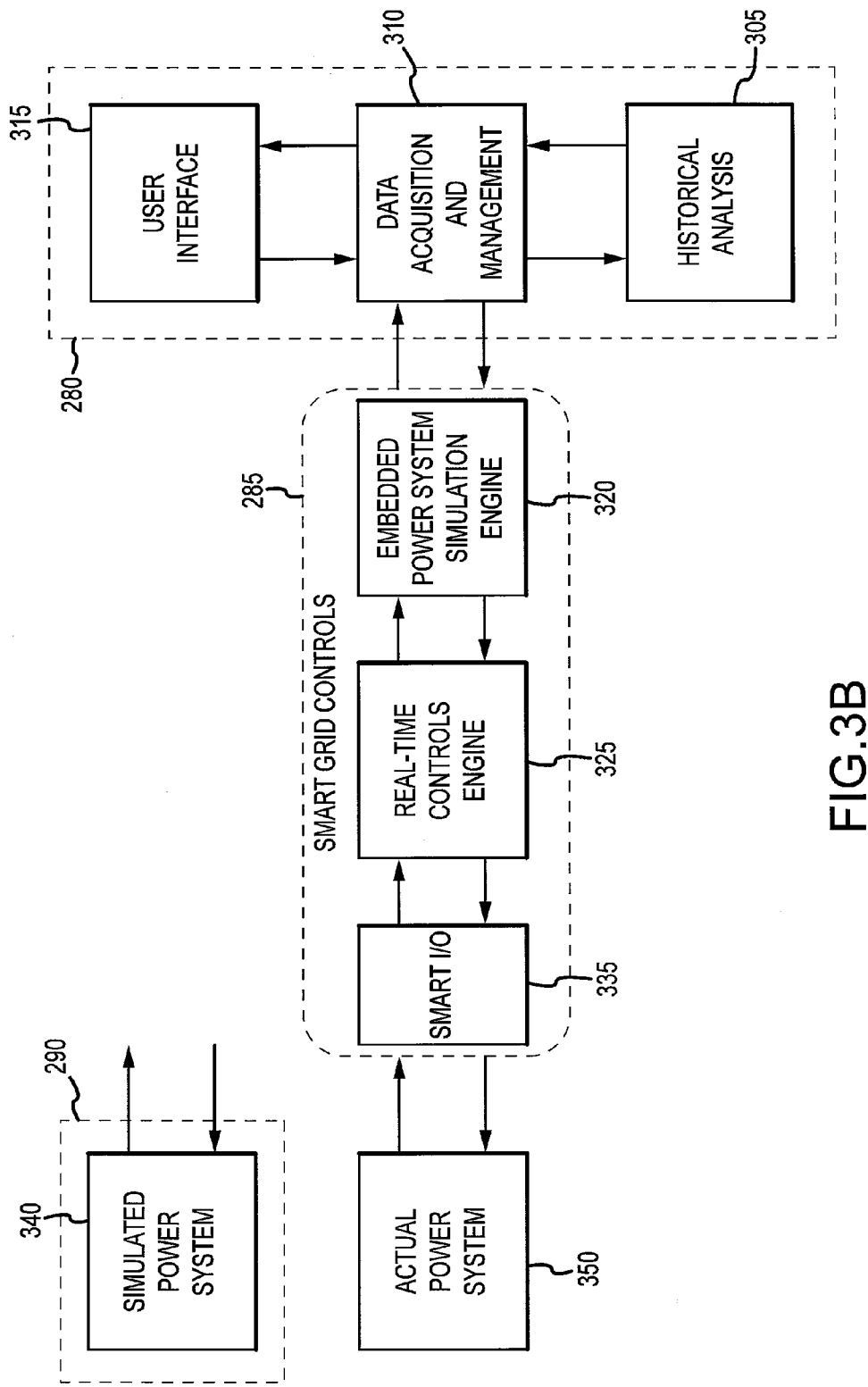
Figure 4:
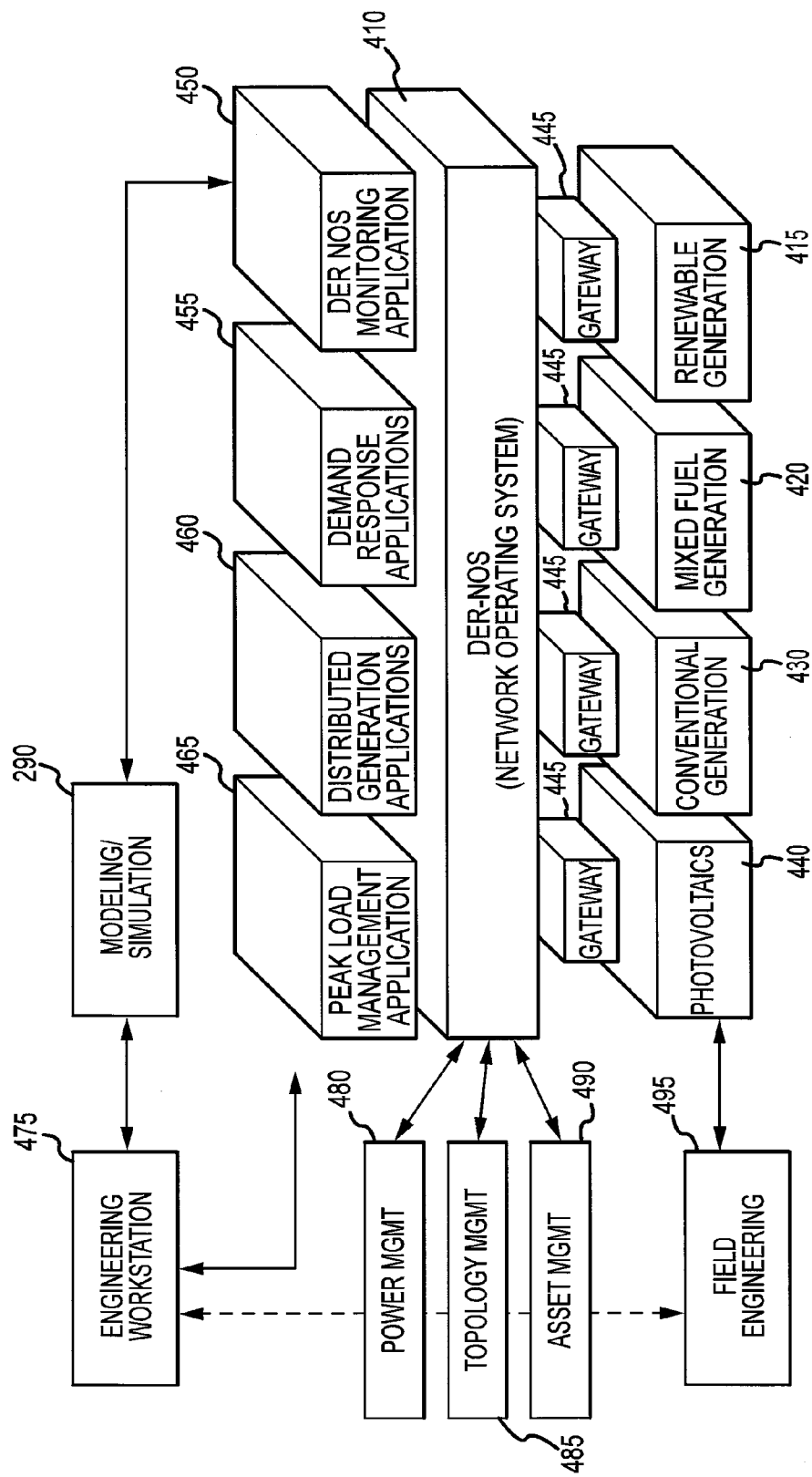
Figure 5:
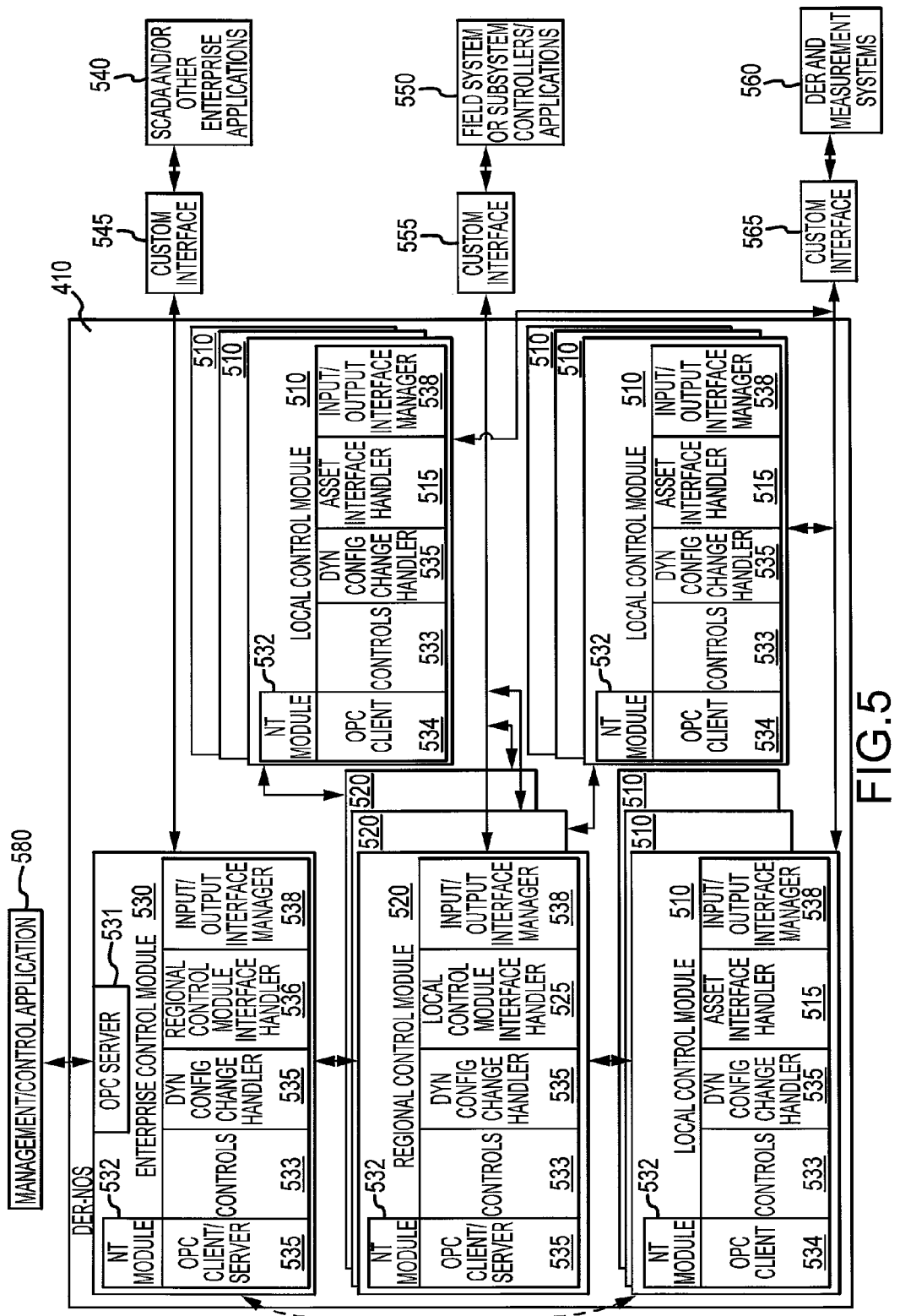
Figure 6:
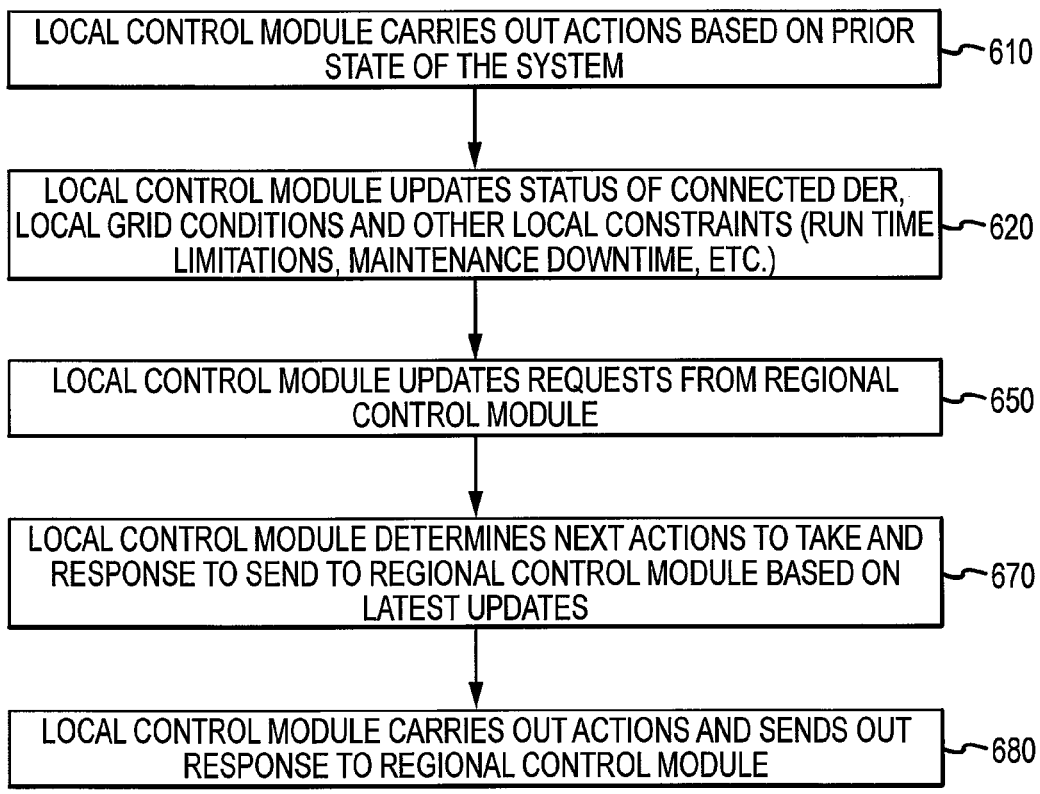
Figure 7:
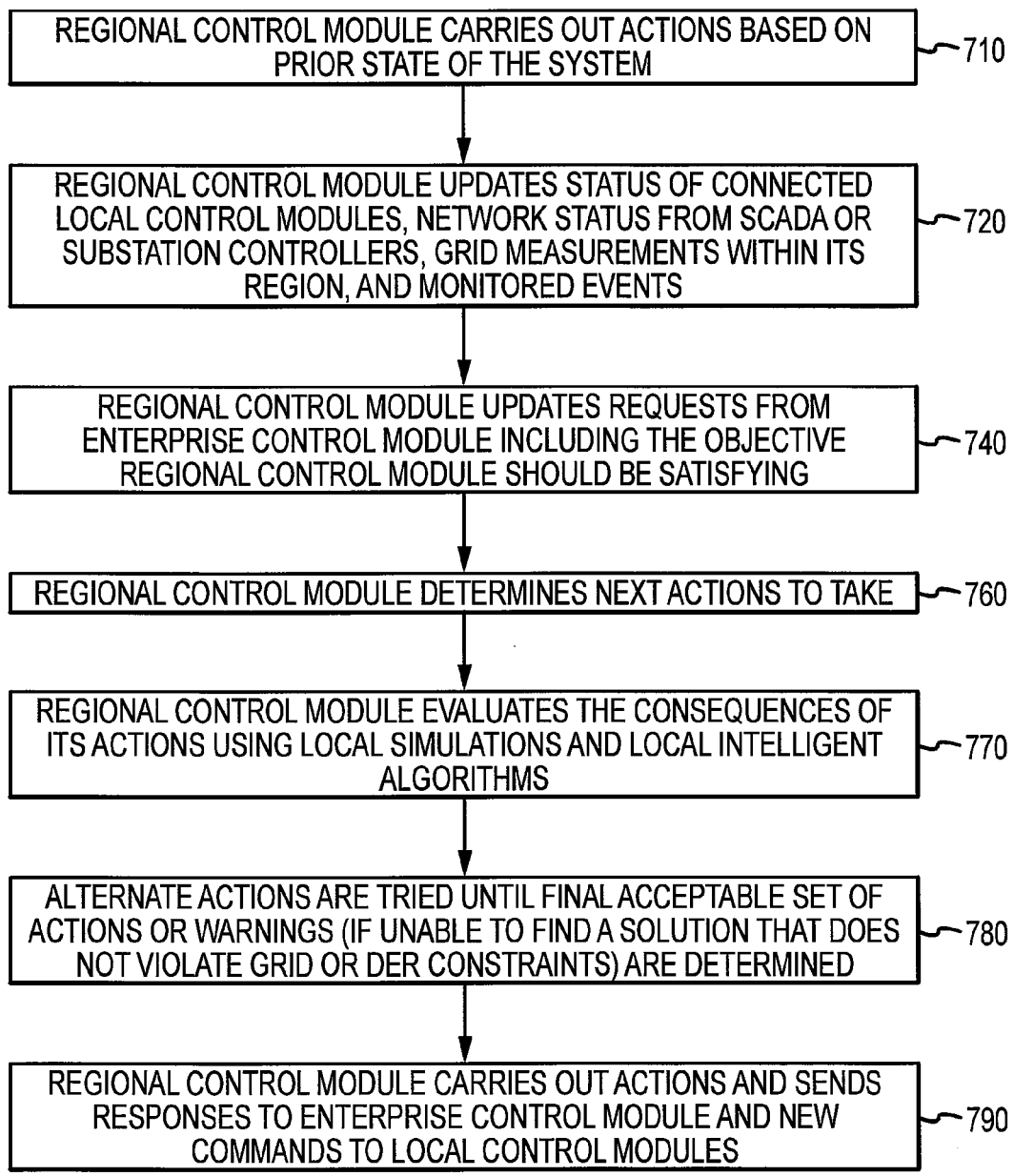
Figure 8:
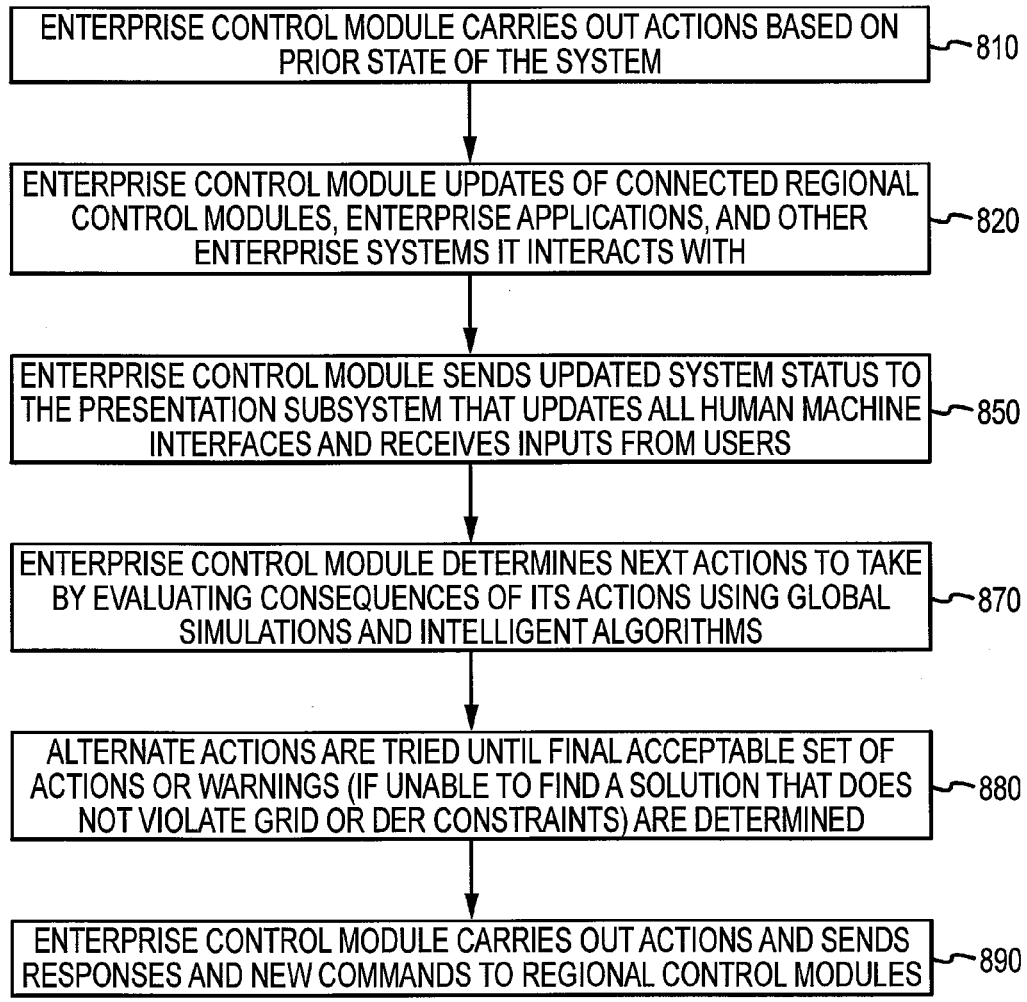
Figure 9:
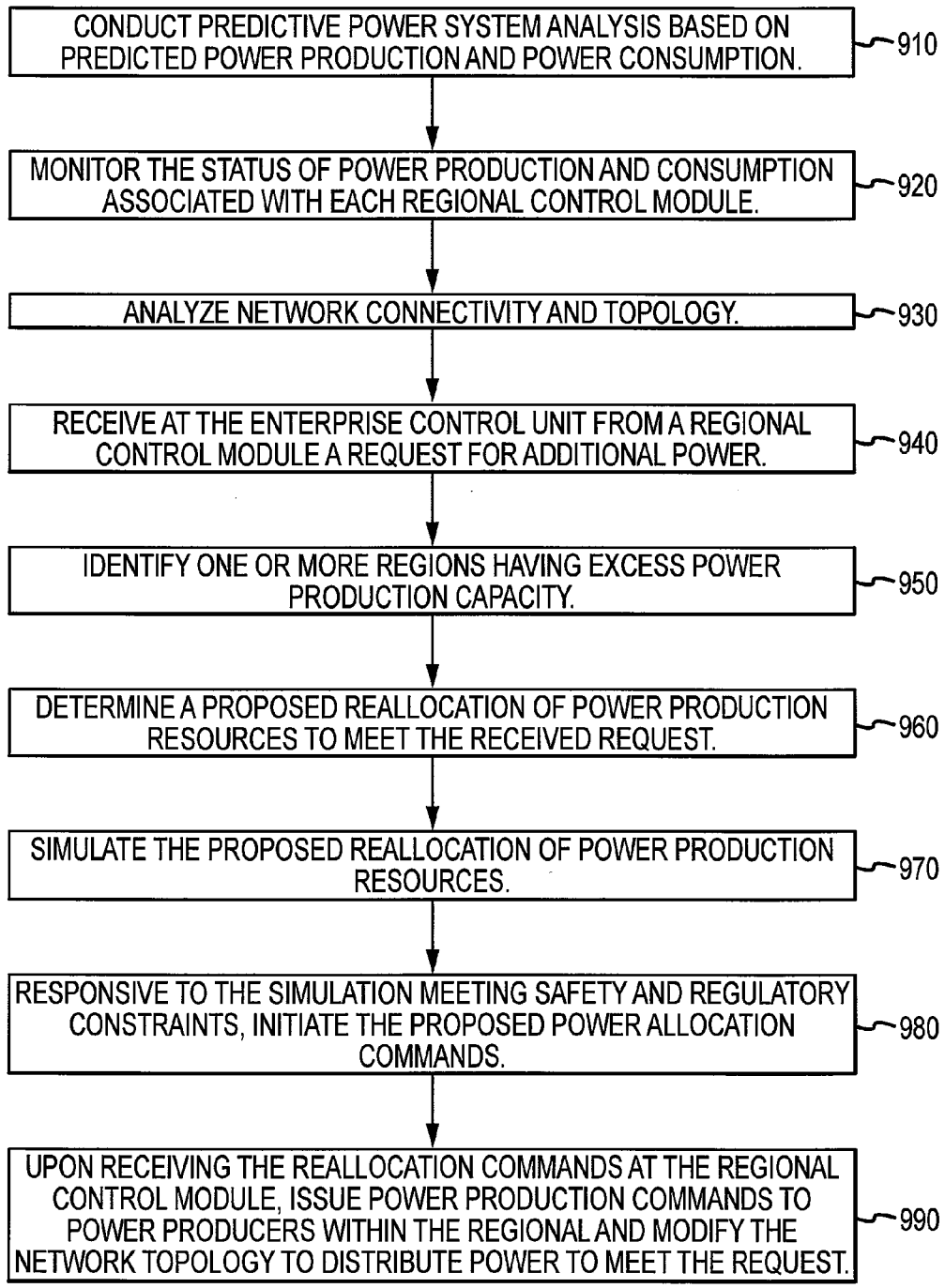

3B is a high level block diagram showing a process flow for implementing the distributed control methodology tested in 3A using a simulated power system into an actual power system without making any changes to the control methodology according to one embodiment of the present invention;

FIG. 4 is a high level functional block diagram of a distributed energy resource network operating system (an alternative embodiment of the smart grid controls presented in FIGS. 3A and 3B) for power production, topology and asset management according to one embodiment of the present invention, wherein new applications are using the functional capabilities exposed by a distributed energy resources network operating system to implement more complex system capabilities as described in herein;

FIG. 5 is a high level block diagram of a multilayered architecture for controlling a distributed power grid according to one embodiment of the present invention;

FIG. 6 is a flowchart for local control module operations according to one embodiment of the present invention;

FIG. 7 is a flowchart for regional control module operations according to one embodiment of the present invention;

FIG. 8 is a flowchart for enterprise control module operations according to one embodiment of the present invention;

FIG. 9 is a flowchart of one method embodiment for controlling power distribution and production in a distributed power grid according to the present invention. In this embodiment demand reduction is captured as negative generation.

The Figures depict embodiments of the present invention for purposes of illustration only. One skilled in the art will readily recognize from the following discussion that alternative embodiments of the structures and methods illustrated herein may be employed without departing from the principles of the invention described herein.

Glossary Of Terms

As a convenience in describing the invention herein, the following glossary of terms is provided. Because of the introductory and summary nature of this glossary, these terms must also be interpreted more precisely by the context of the Detailed Description in which they are discussed.

Cloud Computing is a paradigm of computing in which dynamically scalable and often virtualized resources are provided as a service over the Internet. Users need not have knowledge of, expertise in, or control over the technology infrastructure in the "cloud" that supports them. The term cloud is used as a metaphor for the Internet, based on how the Internet is depicted in computer network diagrams, and is an abstraction for the complex infrastructure it conceals.

HTTP (HyperText Transfer Protocol) is a communications protocol for the transfer of information on the Internet or a similar wide area network. HTTP is a request/response standard between a client and a server. A client is the end-user, the server is the web site. The client making a HTTP request—using a web browser, spider, or other end-user tool—is referred to as the user agent. The responding server—which stores or creates resources such as HTML files and images—is called the origin server. In between the user agent and the origin server may be several intermediaries, such as proxies, gateways, and tunnels. HTTP is not constrained to using TCP/IP (defined below) and its supporting layers, although this is its most popular application on the Internet.

A Web Server is a computer housing a computer program that is responsible for accepting HTTP requests from web clients, which are known as web browsers, and serving them HTTP responses along with optional data contents, which usually are web pages such as HTML documents and linked objects (images, etc.).

The Internet Protocol (IP) is a protocol used for communicating data across a packet-switched internetwork using the Internet Protocol Suite, also referred to as TCP/IP. The Internet Protocol Suite is the set of communications protocols used for the Internet and other similar networks. It is named from two of the most important protocols in it, the Transmission Control Protocol (TCP) and the Internet Protocol (IP), which were the first two networking protocols defined in this standard. Today's IP networking represents a synthesis of several developments that began to evolve in the 1960s and 1970s, namely the Internet and LANs (Local Area Networks), which emerged in the mid- to late-1980s, together with the advent of the World Wide Web in the early 1990s. The Internet Protocol Suite, like many protocol suites, may be viewed as a set of layers. Each layer solves a set of problems involving the transmission of data, and provides a well-defined service to the upper layer protocols based on using services from some lower layers. Upper layers are logically closer to the user and deal with more abstract data, relying on lower layer protocols to translate data into forms that can eventually be physically transmitted. The TCP/IP model consists of four layers (RFC 1122). From lowest to highest, these are the Link Layer, the Internet Layer, the Transport Layer, and the Application Layer.

A wide area network (WAN) is a computer network that covers a broad area (i.e., any network whose communications links cross metropolitan, regional, or national boundaries). This is in contrast with personal area networks (PANs), local area networks, campus area networks (CANs), or metropolitan area networks (MANs) which are usually limited to a room, building, campus or specific metropolitan area (e.g., a city) respectively. WANs are used to connect local area networks and other types of networks together, so that users and computers in one location can communicate with users and computers in other locations. Many WANs are built for one particular organization and are private. Others, built by Internet service providers, provide connections from an organization's local area networks to the Internet.

A local area network (LAN) is a computer network covering a small physical area, like a home, office, or small group of buildings, such as a school, or an airport. The defining characteristics of LANs, in contrast to WANs, include their usually higher data-transfer rates, smaller geographic area, and lack of a need for leased telecommunication lines.

The Internet is a global system of interconnected computer networks that use the standardized Internet Protocol Suite, serving billions of users worldwide. It is a network of networks that consists of millions of private, public, academic, business, and government networks of local to global scope that are linked by copper wires, fiber-optic cables, wireless connections, and other technologies. The Internet carries a vast array of information resources and services, most notably the inter-linked hypertext documents of the World Wide Web and the infrastructure to support electronic mail. In addition, it supports popular services such as online chat, file transfer and file sharing, gaming, commerce, social networking, publishing, video on demand, teleconferencing and telecommunications.

SCADA, or Supervisory Control And Data Acquisition refers to an industrial control system, electric grid control system or computer system used in conjunction with monitoring and controlling a process. Generally speaking, a SCADA system usually refers to a system that coordinates monitoring of sites or complexes of systems spread out over large areas. Most control actions are performed automatically by Remote Terminal Units (RTUs) or by Programmable Logic Controllers (PLCs). For purposes of the present invention, SCADA is one of the many means by which the present invention gains power consumer demand information as well as related data concerning the distributed power grid.

Distributed Energy Resources (DER) are assets, equipment, or systems capable of producing power, storing/releasing energy, managing consumption, and providing measurements and control distributed throughout a power grid. Each of the resources varies as in type and capability.

OPC ((Object Linking and Embedding) for Process Control) is a software interface standard that allows Windows programs to communicate with industrial hardware devices. OPC is implemented in server/client pairs. The OPC server is a software program that converts the hardware communication protocol used by a Programmable Logic Controller (PLC) (a small industrial computer that controls one or more hardware devices) into the OPC protocol. The OPC client software is any program that needs to connect to the hardware. The OPC client uses the OPC server to get data from or send commands to the hardware. Many interface standards and protocols are available for exchanging information between applications or systems that the present invention utilizes for communicating with various DER, applications, and systems.

A Smart Grid delivers electricity from suppliers to consumers using digital technology to control energy production, consumption, storage and release, appliances at consumer's homes manage demand and/or save energy, reduce cost and increase reliability and transparency. The difference between a smart grid and a conventional grid is that pervasive communications and intelligent control are used to optimize grid operations, increase service choices, and enable active participation of multiple service providers (including energy consumers) in a complex web of dynamic energy and services transactions.

DESCRIPTION OF THE INVENTION

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

Embodiments of the present invention enable the management and control of a plurality of DER and network elements connected to a distributed power grid. Unlike traditional power grids a smart power grid allows power generation, storage, and load management within distribution networks on a local or regional level. To facilitate the generation, storage, load management and distribution of power the present invention integrates a multi-layer control system which acts to interface a plurality of diverse applications offering a variety of services to a plurality of diverse energy producing and controlling elements. Included in the description below are flowcharts depicting examples of the methodology which may be used to control and manage a transmission and distribution power grid using the capabilities of DER and systems installed within it. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture, including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

Currently, power grid systems have varying degrees of communication within control systems for their high value assets, such as in generating plants, transmission lines, substations and major energy users. In general, information flows one way, from the users and the loads they control back to the utilities. The utilities attempt to meet the demand with generators that automatically follow the load and thereafter by dispatching reserve generation. They succeed or fail to varying degrees (normal operations, brownout, rolling blackout, uncontrolled blackout). The total amount of power demand by the users can have a very wide probability distribution which requires spare generating plants to operate in a standby mode, ready to respond to the rapidly changing power usage. This grid management approach is expensive; according to one estimate the last 10% of generating capacity may be required as little as 1% of the time, and brownouts and outages can be costly to consumers.

Existing power lines in the grid were originally built using a radial model, and later connectivity was guaranteed via multiple routes, referred to as a meshed network structure. If the current flow or related effects across the network exceed the limits of any particular network element, it could fail, and the current would be shunted to other network elements, which eventually may fail also, causing a domino effect. A technique to prevent this is load shedding by a rolling blackout or voltage reduction (brownout).

Distributed generation allows individual consumers to generate power onsite, using whatever generation method they find appropriate. This allows individuals to tailor their generation directly to their load, making them independent from grid power failures. But, if a local sub-network generates more power than it is consuming, the reverse flow can raise safety and reliability issues resulting in a cascading failure of the power grid. Distributed generation can be added anywhere on the power grid but such additional energy resources need to be properly coordinated to mitigate negative impacts to the power system. Embodiments of the present invention address this need to safely and reliably control power production, distribution, storage, and consumption in a distributed power grid.

According to one embodiment of the present invention a multilayer control system is overlaid and integrated onto the existing power grid. Using data collected in conjunction with existing SCADA systems, an enterprise control module governs overall power demand, control, management and distribution. This enterprise control module interacts with regional control modules, that serve to manage power production and distribution on a local or regional level. Each regional control module interfaces with multiple DER within its area of responsibility to dynamically manage power production and consumption keeping the system within its predefined reliability and safety limits. These three layers, the enterprise control module, the regional control module and the local control module, form a distributed energy resource network operating system which acts as a stable environment to which any one of a plurality of energy producers provide energy and one from which any one of a plurality of energy consumers can draw energy. The system of the present invention enables the individual components of the power grid, energy consumers and producers, to change dynamically without detrimentally affecting the stability and reliability of the distributed power grid.

Figure 1:
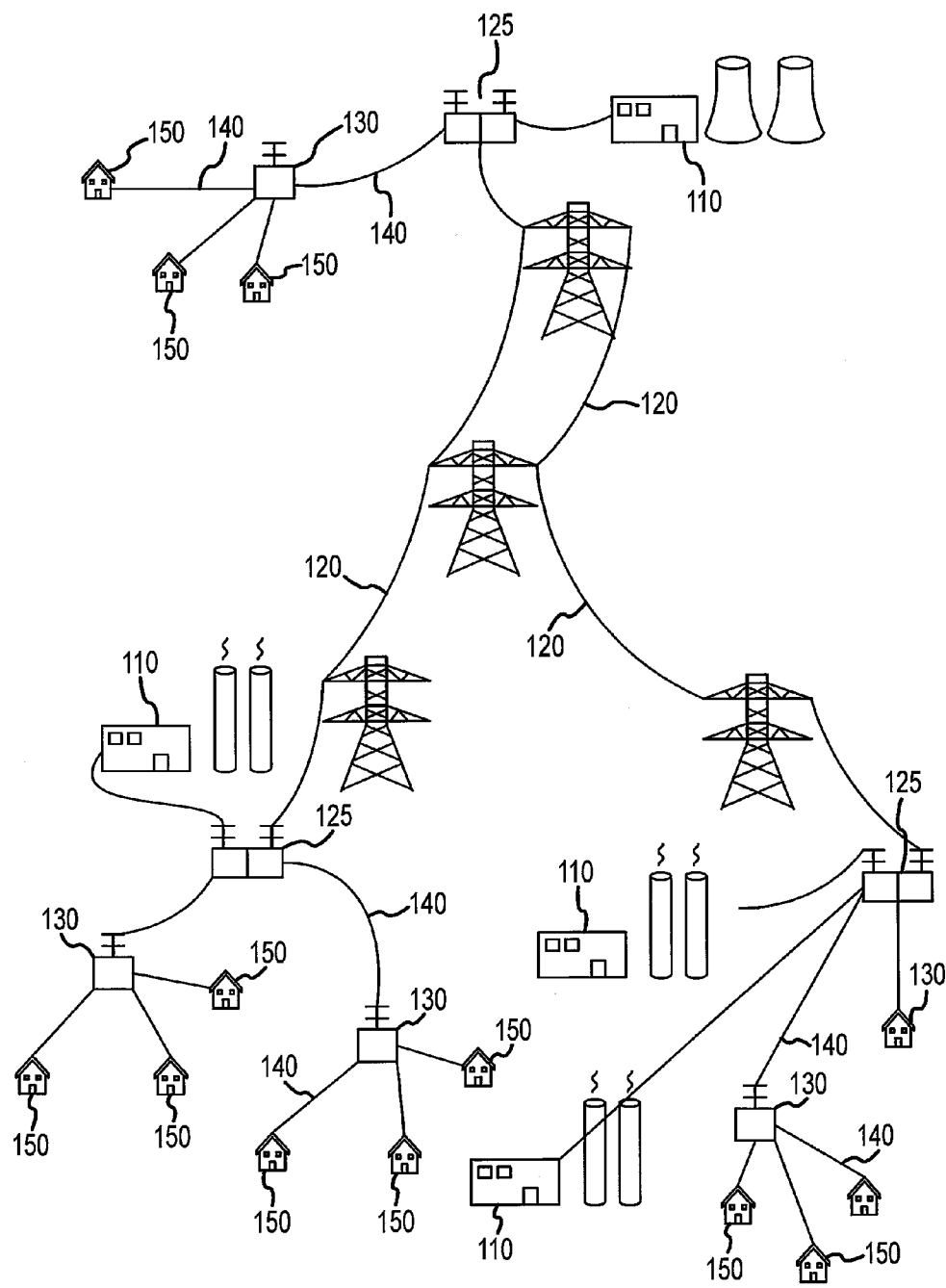
FIG. 1 shows a legacy power distribution grid as known in the prior art.
Figure 2:
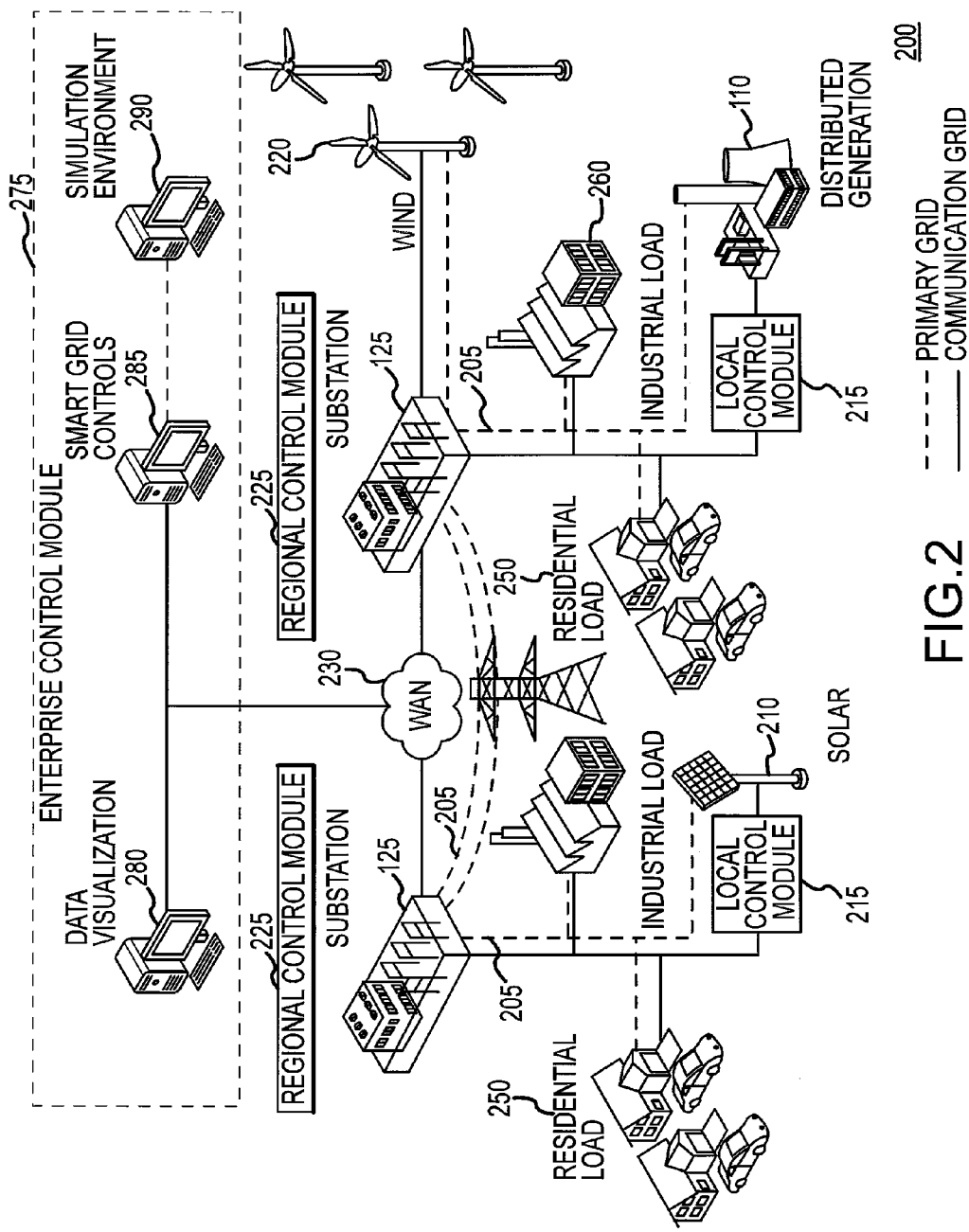
FIG. 2 shows a high level process overlay of a system for controlling a distributed power grid according to one embodiment of the present invention.

FIG. 2 shows a high level overlay of a communication system for controlling a distributed power grid according to one embodiment of the present invention. Traditional power generation facilities 110 are coupled to substations 125 as are wind turbine farms 220 and solar arrays 210. While FIG. 2 shows three forms of power generation, one skilled in the art will recognize that the present invention is applicable to any form of power generation or energy source. Indeed the present invention is equally capable of managing power added to the distributed energy grid from batteries as may be found in electric vehicles as long as the power is compatible with the grid format.

Associated with each substation 125 is a regional control module 225. The regional control module manages power production, distribution, and consumption using available DER within its region. Also associated with each region are industrial loads 260 that would be representative of large commercial enterprises and residential loads 250. According to the present invention, each regional control module using one or more applications is operable to autonomously manage the power distribution and production within its region. Autonomous operation can also be in island mode where the management of grid frequency and voltage are performed at a fast enough rate to accomplish safe grid operations. The present invention dynamically manages various modes of operation of the DER and grid to carry out these functions in addition to managing the power flows.

Each power producing entity 210, such as the traditional power generation plants 110 and the renewable or alternative energy sources 220, interfaces with the regional grid via a local control module 215. The local control module 215 standardizes control command responses with each of the plurality of power producers. By offering to the regional control module 225 a standardized response from each of the plurality of power producing entities, the regional control module can actively manage the power grid in a scalable manner. This means that the controller can dynamically alter its actions depending on the DER that is available at any time. The distributed controller dynamically and automatically compensates for assets that may be added, go out of service, fail, or lose connectivity. This capability gives the current invention a highly scalable nature minimizing the need to manually change the system every time there is a change in network structure or DER availability. This is a unique and distinguishing feature of this invention.

To better understand the versatility and scalability of the present invention, consider the following example. FIG. 2 shows a primary power grid 205 (shown in dashed lines) overlaid with a power distribution management network 200. Assume as depicted in FIG. 2 a regional control module 225 is actively managing power production, consumption and distribution of energy within its area of responsibility. To do so the regional control module 225 interacts with the enterprise control module 275 which in turn gives the regional control module 225 access to smart grid controls 285, data 280 and other management applications that are associated with the enterprise control module 275. In this example consider that the area of responsibility includes a distributed energy generation plant 110 and a wind farm electric power facility 220. Beyond interacting with these power producing facilities, the regional control module 225 is also aware of energy consumption and demand by residential loads 250 and commercial loads 260. Assume that there is no wind and thus the wind production facility 220 is idle. Accordingly the regional control module manages the distribution of energy generated by the power plant 110 and power drawn from the primary grid 205 to the various energy consumers 250, 260.

Further assume that a breeze begins to blow sufficient to power the wind turbines. One by one a plurality of wind turbines come on line and being producing power. As each wind turbine begins producing power it is identified to the regional control module 225 and indeed the entire distributed energy resource network operating system as a wind turbine having particular characteristics and properties. Knowing these characteristics and properties the regional control module can establish communication and control of the turbine. As the wind turbine(s) can provide additional power the regional control module can decrease production requests to the power plant 110 based on its analysis of both the residential 250 and commercial 260 load and adjust the power drawn from the primary grid 205 to maintain the system within operating limits or market based contractual limits.

In doing so the regional control module 225 can modify the distribution scheme (network topology) within its region to optimize power production and distribution. Lastly assume that one of the wind turbines in the wind turbine farm 220 is of a type that is unknown to the regional control module. While producing power its characteristics, properties, and other pertinent data with respect to power production is not possessed by the regional control module. According to one embodiment of the present invention, the regional 225 and local 215 control modules send out a plurality of inquiries to the new wind turbine to ascertain data pertinent to the wind turbine's integration into the distributed power grid. This data can also be obtained through manual input by operators. Once gained, this information is shared to the enterprise control module 275 which stores the data in a repository accessible by all regional control modules.

Power generation at a traditional power plant occurs by generating steam which turns one or more steam driven turbines which thereafter drives an electrical generator. As demand increases within the region there is a finite amount of time from when the demand is realized and the new amount of energy can be produced. This sort of response is different for each type of power generation. For example, from the time an increasing demand is realized to that when power generated by a gas turbine is available, two minutes may elapse. This means the time between when the control interface issues a command to the gas turbine to begin producing power to that when the power is actually realized at the substation may be as much as five minutes or some other period of time. Alternatively, a steam powered turbine may be able to increase its output within 30 seconds, a spinning natural gas reciprocating engine may be able to increase its output in seconds and a flywheel may be able to contribute energy instantaneously. The responsiveness to control inputs of each power producing system is different. Control algorithms within the different layers of the present invention manage these distinctions so that power production dynamically meets power demand at all times. Another embodiment of the present invention standardizes responses to control inputs with respect to power generation. Knowledge of the response characteristics of DER enables the controller to reliably issue appropriate signals to produce desired results. By doing so each DER becomes the equivalent of a "plug and play" energy production device. While each DER is unique, its interface into the control management system of the present invention is standardized making the control and management of a plurality of diverse DERs possible. The information concerning the performance characteristics, operating boundaries, and other constraints of DERs and the grid are used by the various control layers to take local or regional actions without the need for a central decision making authority such as in conventional SCADA-based grid control systems. This unique approach enables the present invention to be highly scalable, rapidly respond to changing conditions and incorporate a diversity of generation, storage, and load management assets geographically dispersed within the electric power system.

As with the communication between the regional control module 225 and the enterprise control module 275, each local control module 215 provides data to the regional control module 225 regarding DER characteristics. These characteristics may include maximum output, minimum output, response time, and other characteristics as would be known to one skilled in the art. Understanding these characteristics, the regional control module 225 and the enterprise control module 275 can manage power production and distribution without risking the reliability and safety of the grid.

Consider another example in which a regional control module 225 recognizes an increase in power demand. Through the associated local control modules 215 within the region, the regional control module 225 can direct one or more additional power producers to meet this increased amount. Understanding control response of each of the power producers, the regional control module can issue commands at the appropriate time and in the appropriate sequence to meet the dynamic needs of the region.

The regional control module 225 is further aware of the electricity producing capacity within the region and the limitations to the distribution grid. The regional control module 225 understands topology with respect to the power producers and power consumers and its own ability to distribute the power. Each regional control module 225 is communicatively coupled to an enterprise control module 275 via, in one embodiment of the present invention, a wide area network 230. As one skilled in the art will appreciate, a wide area network can be the Internet or other means to communicate data among remote locations. In other embodiments of the present invention data can be exchanged between the enterprise control module 275 and the regional control modules 225 via a local area network or Intranet.

According to one embodiment of the present invention, the enterprise control module 275 includes the plurality of applications to aid in the management of a distributed power grid. These applications can include, inter alia, data visualization 280, smart grid controls 285 and environment simulation 290. The smart grid controls 285 include capabilities such as active and reactive power flow control, voltage and Voltage Amprage Reactive (VAR) control on feeders or grid interconnection points, intermittency management using various assets to counteract the variability of power generation from renewable generation sources such as wind turbines and solar panels, and optimal dispatch of generation, storage, or controllable loads to meet operations, cost, or emissions criteria.

The enterprise control module 275 is operable to manage the interaction of several regional control modules 225 and the power producers under their control. As previously described, each regional control module 225 using applicable applications can dynamically manage the power consumers and power producers within its control. As demand (active power or reactive power) within a certain region managed by a regional control module 225 increases or decreases one or more DER management applications can act to compensate for power production within a particular region. The presence of an overreaching enterprise control module 275 and regional control modules 225 enables this type of dynamic and stable control. However, it is recognized by the present invention that power consumer demand in one region may exceed the ability for that region's power producers. One feature of the present invention is that the enterprise control module 275 using a DER application is tasked to manage and control requests for additional power as well as the availability of excess power producing capacity. In essence, the enterprise control module provides system-level coordination, the regional control module provides regional coordination, and the local control module provides fast control of assets thereby providing smooth control over a large number of assets over different time scales and different geographic reach to meet specific system goals.

The data visualization unit 280 is operable to provide a user or DER application with the current status of electricity demand and power producing capacity throughout the distributed power grid. At any point in time a user can visualize the ability for power producers to provide additional power, or the particular load experienced in a region. Moreover, the data visualization module 280 can indicate to a user the availability of a path by which to distribute power. Prior to issuing a command to regional control module 225 to increase the production of electricity, the enterprise control module 275 can simulate the effects of a proposed command to test the stability of the grid under the proposed change.

The simulation model 290, utilizing real-time data from existing regional control modules 225 and their DER facilities, can initiate a series of simulated commands to meet projected loads. Knowing the topology of the distribution grid and the electrical properties of the elements within the affect of the control area, the simulation model 290 can validate whether a proposed command will meet the increased load within predefined limits such as safety and regulatory constraints. Once a proposed command has been validated using the simulation module 290, the same commands can be passed to the smart grid control module 285 for execution. This could be an automatic action or can be mediated by a human operator. This simulation model takes into account the behavior and effects of the multi-layered distributed power grid control system of the present invention deployed within the system. The ability of the simulation to take into account the behavior of the multi-layered distributed power grid control system is a distinguishing feature of this invention.

FIGS. 3A and 3B are a high level block diagrams showing a process flow for implementing simulated (FIG. 3A) and actual (FIG. 3B) control methodology into a power system according to one embodiment of the present invention. In one embodiment of the present invention the data visualization module 280 includes a user interface 315, data acquisition and management module 310 and historical data and analysis module 305. These modules work in conjunction with one another to collect and analyze data from the distributed power grid via regional control modules 225 to present to a user via the user interface 315 information with respect to the distributing grid including its status with respect to power production and power consumption.

Using this information a set of commands can be issued using the smart grid control module 285 to manage power production and distribution within the distributed power grid. Within the smart grid control module 285 exists an embedded power system simulation engine 320, a real-time control engine 325 and a real-time, intelligent control interface 335. As shown in FIG. 3, the smart grid control module 285 interacts with a simulated power system 340 as part of the environment simulation model 290. As one skilled in the relevant art will appreciate, the simulation module 290 can include a variety of models with respect to the distributed power grid. As shown in this example, the environment simulation module 290 includes a simulated power system 340. However the environment simulation module 290 can also include models with respect to the distributing grid topology, DER characteristics, load models, and other characteristics which are critical to the accurate and dynamic management of the distributed power grid.

Each of these modules (the smart grid control module 285, the real time intelligent control interface, the simulated power system 340, the simulation module 290, embedded power system simulation engine 320 and real-time control engine 325) integrate with the multi-layered distributed power grid control system of the present invention so as to manage and control the power grid.

Turning back to FIG. 3, a user (or an application running on the enterprise control module when operating in an automatic mode), recognizing an increase in demand from the data supplied by the regional control modules throughout the distributing grid, can initiate a series of commands through the smart grid control module 285 using the embedded power system simulation engine 320 and the simulated power system 340. In the simulated environment real-time controls and intelligent interface commands are developed and tested. Once developed, the commands are executed in a simulated environment to ascertain whether the proposed solution will exceed or comply with predefined limits including safety and regulatory constraints imposed on the distributed power grid. In essence the multi-layered distributed power grid control system of the present invention provides real-time actual data with respect to the current grid topology and energy producers as well as real-time data regarding energy consumption to a simulation engine which then carries out one or more simulations of proposed solutions to meet increased electricity demands.

Once a series of simulations has been validated by the environment simulation module 290, the grid control strategy can be applied to the actual power system 350 without fear that the alteration in the grid will adversely affect the grid's stability. This is accomplished by installing the multilayered distributed power grid control system 285, and the data management and visualization module 280, in the field and connecting them to the physical grid 205 and devices 350, instead of the simulated grid and assets 290. During application of the actual commands to the actual power system 350, data is once again acquired through the data acquisition and management module 310 to verify that the commands issued are producing the desired results. The ability of the system to evaluate the behavior of the multilayered distributed power grid control system 285 in simulation and then to deploy it directly to the field (with very minimal modifications such as device addressing) is one of the distinguishing features of the present invention.

Managerial applications operating on the enterprise layer 275 can initiate commands to one or more of the regional control modules 225 to increase power production and transfer power among the variety of regions within the distributed power grid. For example, consider a region managed and controlled by a regional control module 225 that is experiencing an increase in power demand or load. This increase in demand may be the result of an unusually high temperature day resulting in increased air-conditioned use or the increase may be expected during working hours due to a high concentration of the industry located within the region. The regional control module 225 in conjunction and in communication with the enterprise control module 275 can predict and recognize this load increase using peak load management, demand response, or other DER management applications. The regional control module 225 can further recognize that the power producers within the region are incapable of producing enough power to meet the demand or their ability to produce such power would exceed safety and regulatory constraints.

Upon recognizing that such a situation may occur the regional control module 225 issues a request for additional power through the enterprise control module 275. Applications associated with the enterprise control module 275 issue queries to the remaining regional control modules 225 regarding their ability to produce excess power. Other regional control modules 225 can respond to the inquiry indicating that it has the ability to increase power production in response to the request for power by another region.

Understanding that one region has an excess capacity of power and another has a need for additional power, as well as knowing the topology of the distributed power grid, applications associated with the enterprise control module 275 can run a series of simulated controls to increase power production of a first region and transfer the excess power to a second region. Once the commands have been validated, the commands are issued by the smart grid control module 285 to both of the affected regional control modules 225; i.e., the region having an excess power capacity and the regional control module 225 of the region requesting power. Furthermore, a distribution application can configure switches throughout the distributed power grid to transfer power from the first region to the second region.

The request for power from one region and the response with excess power from another, as managed by one or more applications affiliated with the enterprise control module 275, is a dynamic process. One skilled in the relevant art will recognize that the consumption of electricity within a particular region varies dynamically, as does the ability of any region to produce power. While historical data can provide insight regarding typical loads experienced by one or more regions, as well as the ability of another region to produce excess power, the production and transfer of power must be controlled dynamically and in real-time. Within the multilayered distributed power grid control system of the present invention, different power management functions are carried out by the different layers. The ability to "look-ahead" to make decisions about what actions to take using simulations exist at every level. This is as a feature of the distributed controller—not all decisions have to be made at the enterprise level. This is also true for the simulations—many simulations are carried out at the regional controller level, while systems level simulations may be carried out at the enterprise level. In essence, simulations necessary for real-time control are carried out automatically at the appropriate control layer, simulations to provide operators with options that they may have under various operations situations is carried out at the enterprise level.

FIG. 4 is a high level functional block diagram of a distributed energy resource network operating system for power production, topology and asset management according to another embodiment of the present invention. A Distributed Energy Resource Network Operating System (DER-NOS) 410 is interposed between a plurality of management applications and a variety of energy producing resources. According to one embodiment of the present invention, the DER-NOS interfaces with a variety of power producing resources using a gateway or interface (local control module) 445. The gateway 445 is an interface that issues commands in a correct order to sequence and format for that particular device to ensure that each device operates in the same manner from manufacturer to manufacturer. This gateway 445 also runs the lowest layer of the multilayered distributed power grid control system. In this example, the DER-NOS consistently interacts with DER such as a photovoltaic cells 440, conventional power generation plants 430, mixed fuel generation capabilities 420, renewable generation resources 415 and the like. It is also capable of managing additional assets such as storage devices or load management systems. The DER-NOS has the ability to manage and control a variety of power producing, storing, and consuming resources utilizing a variety of application tools.

According to one embodiment of the present invention, distributed energy resources can be managed and controlled using application modules including inter alia peak load management 465, distributed generation applications 460, demand response applications 455, and other DER-NOS monitoring applications 450. Each of these management and control tools interact with an engineering workstation to assist a user to deploy the system and to understand and manage the distributed energy resources throughout the distributed power grid. This management and control is accomplished via the DER-NOS. One skilled in the relevant art will recognize that the engineering workstation 475 interacts, in one embodiment, with a data visualization model 280 as described with respect to FIG. 2. This engineering workstation enables the system to be configured to match field conditions.

FIG. 4 further shows an interaction between the engineering work station 475 and the monitoring application 450 via a modeling simulation module, also referred to herein as the simulation module 290. The monitoring applications provides real time data to the simulation module that in turn is used to configure and tune the system. This ability of the system to utilize real time data from the field to carry out simulations to further tune the system in an integrated manner distinguishes the current invention from the prior art.

The DER-NOS interacts with a variety of management applications 465, 460, 455, 450 and the energy producing resources 440, 430, 420, 415 to provide power management 480, topology management 485 and energy resource asset (DER) management 490. This management is accomplished, according to one embodiment of the present invention, a three layer operating system acting as a bridge between the management applications on one hand and the distributed energy resources on the other. Without the DER-NOS of the present invention, each management and control application would have to develop custom commands to gain data, interface with each DER, send instructions and how it implements other functions that mesh the application with the various DER. The DER-NOS is a common platform for all power management applications to use. For example, according to one embodiment of the present invention, the distributed generation application 460 does not need to know what specific commands must be issued to cause a particular type of steam power electrical generator to increase production. It simply issues an instruction that the plant should increase production and the DER-NOS conforms the command to a format that the steam power electrical generator will recognize. Further, the DER-NOS also carries out "aggregation" and "virtualization" of DER. This is accompanied by dynamically pooling different DERs into groups based on user or application specified criteria. The combined capabilities of the DER in the pool and operations that can be performed on the pool are calculated by the DER-NOS. These "virtual" resources (with capabilities comparable to a conventional power plant) are now made available to the variety of management applications 465, 460, 455, 450. Availability, compatibility, assignment to pools and/or applications, conflict resolution, error handling and other resource management functions are carried out by the DER-NOS, much as a computer operating system assigns memory, processor time, and peripheral devices to applications. The ability of the present system to manage resources and make them available individually, in pools, or as virtualized resources to applications for optimally utilizing them for various functions is a significant advantage over prior systems.

FIG. 5 is a high level block diagram of a multilayered architecture for controlling a distributed power grid showing an expanded view of one embodiment of a DER-NOS according to the present invention. As shown in FIG. 5, the DER-NOS includes a multilayered approach having local control modules 510, regional control modules 520, and an enterprise control module 530. The enterprise control module 530 is communicatively coupled to each of a plurality of regional control modules 520 and each regional control module 520 is communicatively coupled to a plurality of local control modules 510. The DER-NOS interacts with external applications and devices through custom interfaces 545, 555, and 565. Through these interfaces the DER-NOS gains the ability to interact with existing DER assets, grid equipment, utility SCADA systems, and other applications to exchange data and control commands. These custom interfaces serve as adapters to translate implementation specific interfaces to the common language used within the system.

The DER-NOS 410 is linked to a variety of management applications 580 as previously shown in FIG. 4. Each of the plurality of management applications 580 is linked to the DER-NOS 410 by an OPC server 531. The enterprise control module 530 and the regional control module 520 both include OPC client/servers 535 to aid in the communication between the DER-NOS 410 and the plurality of management applications 580. As will be understood by one of ordinary skill in the relevant art, utilization of OPC is but one of many means to implement a communication interface. Many other such interfaces that are both reliable and fast can be utilized in conjunction with the present invention without departing from the scope of the inventive material. The enterprise control module 530 uses, in this embodiment, an object model for each asset type within the DER-NOS. The object model not only defines the input and output to a particular asset such as a DER, but also defines the control/system response of changes in commands issued to the asset. Ensuring that an asset responds in a similar manner to a command provides the enterprise control module the ability to maintain a stable and repeatable control architecture. For example, if two generators responded differently to an "OFF" command, the complexity of implementing controls would be difficult as the area under control expands, and the number of varying assets increases. Using a common object information model resolves this dilemma by providing both common information and controls. These common object models are implemented primarily at each local control module 510, based on common object model definitions, and then propagated throughout the system. This approach ensures that the system can interface with any asset in the field regardless of manufacturer or site-specific customization and still have a common object model representing it. The mapping from site, asset, and implementation specific details to a common object model is carried out by the local control module 510.

The enterprise control module 530 is also linked to existing supervisory control and data acquisition systems 540 through a custom interface. Through these systems and with additional data from each regional control module 520, the control unit 530 monitors and controls data points and devices through existing SCADA systems and DER-NOS-specific control modules.

According to one embodiment of the present invention, the enterprise control module 530 includes a network topology module 532, controls 533 by which to manage the regional control modules 520 and the energy resources, a dynamic configuration change handler 535, a regional control module interface handler 536 and an input/output interface manager 538. Regional control modules 520 each include network topology module 532, controls 533 to manage the energy resources within its region, a dynamic configuration change handler 535, a local control module interface handler 525 and an input/output interface manager 538.

Each local control module 510 includes controls 533 by which to manage energy resources using the asset interface handler 515. The local control module 510 also includes and OPC client 534, a dynamic configuration change handler 535 and an input/output interface manager 538. The local control module 510 interacts directly with the power resources (also known herein as Distributed Energy Resources or DERs) 560 and measurement systems through a custom interface 565. The regional control module 520 interacts with field systems 550 and/or subsystem controllers/applications through its custom interface 555. These three layers of the DER-NOS 410 work together with management applications 580 to dynamically manage and control a distributed power grid.

As can be appreciated by one skilled in the relevant art, knowing the network topology is a critical aspect of managing the distributed power grid. The network topology module 532 supports network topology analysis queries which can be integrated into a particular control to enhance the control range/capability. Network topology is the representation of the connectivity between the various elements of the electric power system (transformers, busbars, breakers, feeders, etc) and the DER that is connected to it. DER-NOS uses this subsystem to ensure that future controls can be safely performed while limiting the risk to the stability of the grid. This is accomplished by running load flow calculations and dynamic simulations to predict the future state of the system based on proposed control actions and evaluating whether the resulting state violates any stability, reliability, or operations criteria of the network. The network topology module 532 subsystem can also receive dynamic status updates of the electrical network from a variety of data sources. This allows the network topology module to be updated with the latest information about the state of the "real" system so that predictions can be made with the most recent information available.

The network topology module 532 associated with the enterprise control module 530 can issue queries to the regional control module 520 and wait for results. The regional control module 520 uses its own network topology module 532 and control algorithms to compute results for queries from enterprise control module 530. In this way, the enterprise control module 530 does not need to analyze the entire network itself, but rather distributes the analysis to the regional control modules 520.

The control subsystem 517 associated with the local control module 510 de-codes commands provided from the regional control module 520 directed at power resources 560. The controls subsystem 533 ensures that the targeted asset responds consistently and reliably. This operation translates the common object model based commands used within the system to the site, equipment, and implementation specific commands required to operate the DER 560.

The input/output interface manager 538 provides an interface management system to handle remote communications between the enterprise control module 530 and external systems such as SCADA systems and other enterprise applications. Within the regional control module 520, the input/output interface manager 538 handles remote communications with field devices and systems and subsystems 550 and provides the ability to exchange information and control signals with external devices (distributed energy resources, meters, etc). These input/output interface modules 538, the regional control module interface 536, local control module interface 525, and the asset interface handler 515 enable the system to map external data points, devices, and systems to the common object models used within the system to ensure consistency and reliability between the data used in each subsystem.

Field systems or subsystem controllers and applications 550 is any system external to DER-NOS that the regional control module 520 has to exchange data and control signals with. Example would be a switch (breaker) at a substation.

The dynamic configuration change handler 535, found in each module is the engine that accepts field signals, information from other systems such as utility SCADA, or user inputs and responds to changes in the configuration of the network (network topology), availability of assets, or communications system changes by making internal changes to appropriate parts of the system. Since the DER-NOS is a distributed controller as previously described, the dynamic configuration handler 535 is the engine that ensures that real time change information propagates appropriately throughout the system (without having to shutdown and restart the system) and various resources (DER and grid assets) are put into new modes of operation dynamically.

Typically the local control module 510 only interacts with single devices or a small group of directly connected devices at a single site. Hence it does not require the more sophisticated dynamic configuration manager 535 that deals with configuration changes across multiple devices/sites that are geographically dispersed. The controls at the local control module 533 has the capability to manage configuration changes as required for the devices to which the local control module 510 is connected.

FIG. 6 is a flowchart depicting local control module logical operations according to one embodiment of the present invention. Each layer of the DER-NOS 410 architecture operates independent of the other layers such that if and when communications are lost between layers or other subsystems fail, each control module can continue to operate in a failsafe mode until other systems come back on-line or until preprogrammed sequences, such as a shut down sequence, are triggered.

The local control module operates by carrying out operations based on a prior system state 610. From that state the local control module updates 620 the status of each connected DER as well as local grid conditions and other local constraints on the system. Next an update request is sent 650 from the local control module to the regional control module. Updates are received and thereafter the local control module determines the next actions to be taken and/or response to be sent to the regional control module 670. From that point the local control module carries out 680 one or more actions and updates the regional control module with respect to these actions.

FIG. 7 is a flowchart depicting the operational logic of a regional control module. As with the local control module, the regional control module carries out actions based on a prior system state 710. The regional control modules receives information from and updates the status of each connected local control module 720 as well as the network status from SCADA and/or subsystem controllers. Grid measurements within the region of responsibility as well as monitored events are also updated. Armed with an knowledge of the status of the local control modules under supervision, the regional control module requests 740 updates from the enterprise control module including the objective the regional control module should be satisfying.

The regional control thereafter determines a next course of action 760 to meet these objectives. In doing so the regional control modules evaluates 770 the consequences of each proposed action using local simulation and local intelligent algorithms. Alternate actions are also considered 780 until a final set of actions or warnings are determined. Lastly the regional control module carries out 790 the determined set of actions and sends a response to the enterprise control module informing it of these actions as well as commands to the applicable local control modules.

Finally FIG. 8 is a flowchart depicting the logical operation of an enterprise control module according to one embodiment of the present invention. Again the enterprise control module carries out its actions based on the prior state of the system 810. As the overall governing entity the enterprise control module updates 820 the status of connected regional control modules, enterprise applications and other enterprise assets with which it interacts. System status updates are also sent out 850 to the presentation subsystem that is used to update the user (human) interface system. Likewise the user interface can be used to receive user inputs when provided.

The enterprise control module thereafter determines what action to take next 870 by evaluating the consequences of various actions by conducting global simulations and intelligent algorithms. Alternate actions are considered 880 until a final acceptable set of actions or warnings is determined. Once determined the enterprise control module then executes 890 these actions and sends out response and commands and new commands to the connected regional control modules.

FIG. 9 is a flowchart of one method embodiment for managing power distribution and production in a distributed power grid according to the present invention. As will be appreciated by one skilled in the relevant art, the control and management of distributed energy resources using a network operating system can include among other things allocation of energy production, modification of network topology, energy storage allocations, load management, simulations. FIG. 9 shows one method example of a reallocation of power resources in a distributed power grid. One skilled in the art will recognize that this method example is representative of the interactions between various DER management applications and energy resources via a DER-NOS and is not limiting in the scope or capabilities of the DER-NOS.

According to one embodiment of the present invention, management applications operating through an enterprise control module conducts predictive power system analysis based on projected power production and power consumption 910. As the power system analysis is conducted actual power production and consumption is monitored within each regional control module 920. In addition, network topology is analyzed as well as network connectivity 930.

Upon receiving 940 at the enterprise control module a request for additional power, A demand response application of the enterprise control module identifies one or more regions having excess power production capacity 950. Thereafter the management application determines a proposed reallocation of power production resources and network connectivity modifications to meet the received request 960.

A simulation of the proposed reallocation of power production resources is initiated along with simulations of connectivity changes in the distributed grid 970. Responsive to the results of the simulation meeting predefined constraints, the control application constructs a series of commands to direct the proposed power reallocation 980.

With the proposed reallocation of power production resources validated, the management application and control application directly send via the enterprise control module commands 990 to the applicable regional control modules. Upon receiving the reallocation commands, the regional control module issues power production commands to power producers within its applicable region and/or modifies its network topology to distribute the excess power to meet the load request of other regions.

Embodiments of the present invention are operable to dynamically manage and control a distributed power grid having a plurality of power production resources. A plurality of regional cells within a distributed power grid are autonomously managed using regional control modules operating in conjunction with a multilayered network operating system. Each regional control module is connectively coupled to an enterprise control module which interfaces with various management and control applications overseeing the distributed power grid. In addition each regional control module is associated with a plurality of local control modules which directly interface with power producing resources within the region standardizing DER interfaces. Power production and power consumption are continuously monitored and analyzed. In one embodiment of the present invention, upon the determination that a region's power consumption exceeds its power producing capability, management applications, operating through the enterprise control module, dynamically reallocates power production resources throughout the grid. This reallocation of power production and distribution is continuously monitored and adjusted to ensure that the grid remains stable, reliable and safe.

While the present invention has been described by way of power grid management it is equally applicable and capable of distributed power management within commercial facilities, campuses, or anywhere there are distribution lines that carry power between rooms, buildings, renewable power sources, load management systems, electric vehicles and the like. This is true for larger commercial campuses, military bases, remote off-grid villages and the like. The present invention dynamically forms and manages distributed power systems rather than having statically formed microgrids at a facility or remote location.

As will be appreciated by one skilled in the relevant art, portions of the present invention can be implemented on a conventional or general-purpose computer system such as a main-frame computer, a personal computer (PC), a laptop computer, a notebook computer, a handheld or pocket computer, and/or a server computer. A typical system comprises a central processing unit(s) (CPU) or processor(s) coupled to a random-access memory (RAM), a read-only memory (ROM), a keyboard, a printer, a pointing device, a display or video adapter connected to a display device, a removable (mass) storage device (e.g., floppy disk, CD-ROM, CD-R, CD-RW, DVD, or the like), a fixed (mass) storage device (e.g., hard disk), a communication (COMM) port(s) or interface(s), and a network interface card (NIC) or controller (e.g., Ethernet). Although not shown separately, a real-time system clock is included with the system in a conventional manner.

The CPU comprises a suitable processor for implementing the present invention. The CPU communicates with other components of the system via a bi-directional system bus (including any necessary input/output (I/O) controller circuitry and other "glue" logic). The bus, which includes address lines for addressing system memory, provides data transfer between and among the various components. RAM serves as the working memory for the CPU. The ROM contains the basic input/output system code (BIOS), a set of low-level routines in the ROM that application programs and the operating systems can use to interact with the hardware, including reading characters from the keyboard, outputting characters to printers, and so forth.

Mass storage devices provide persistent storage on fixed and removable media such as magnetic, optical, or magnetic-optical storage systems, flash memory, or any other available mass storage technology. The mass storage may be shared on a network, or it may be a dedicated mass storage. Typically a fixed storage stores code and data for directing the operation of the computer system including an operating system, user application programs, driver and other support files, as well as other data files of all sorts. Typically, the fixed storage serves as the main hard disk for the system.

In basic operation, program logic (including that which implements the methodology of the present invention described below) is loaded from the removable storage or fixed storage into the main (RAM) memory for execution by the CPU. During operation of the program logic, the system accepts user input from a keyboard and pointing device, as well as speech-based input from a voice recognition system (not shown). The keyboard permits selection of application programs, entry of keyboard-based input or data, and selection and manipulation of individual data objects displayed on the screen or display device. Likewise, the pointing device, such as a mouse, track ball, pen device, or the like, permits selection and manipulation of objects on the display device. In this manner, these input devices support manual user input for any process running on the system.

The computer system displays text and/or graphic images and other data on the display device. The video adapter, which is interposed between the display and the system's bus, drives the display device. The video adapter, which includes video memory accessible to the CPU, provides circuitry that converts pixel data stored in the video memory to a raster signal suitable for use by a cathode ray tube (CRT) raster or liquid crystal display (LCD) monitor. A hard copy of the displayed information, or other information within the system, may be obtained from the printer or other output device.

The system itself communicates with other devices (e.g., other computers) via the NIC connected to a network (e.g., Ethernet network, Bluetooth wireless network, or the like). The system may also communicate with local occasionally-connected devices (e.g., serial cable-linked devices) via the COMM interface, which may include a RS-232 serial port, a Universal Serial Bus (USB) interface, or the like. Devices that will be commonly connected locally to the interface include laptop computers, handheld organizers, digital cameras, and the like.

As previously described, the present invention can also be employed in a network setting such as a local area network or wide area network and the like. Such networks may also include mainframe computers or servers, such as a gateway computer or application server (which may access a data repository or other memory source). A gateway computer serves as a point of entry into each network. The gateway may be coupled to another network by means of a communication link. Further, the gateway computer may be indirectly coupled to one or more devices. The gateway computer may also be coupled to a storage device (such as a data repository). The gateway computer may be implemented utilizing a variety of architectures.

Those skilled in the art will appreciate that the gateway computer may be located a great geographic distance from the network, and similarly, the devices may be located a substantial distance from the networks as well. For example, the network may be located in California while the gateway may be located in Texas, and one or more of the devices may be located in New York. The devices may connect to the wireless network using a networking protocol such as the TCP/IP over a number of alternative connection media such as cellular phone, radio frequency networks, satellite networks, etc. The wireless network preferably connects to the gateway using a network connection such as TCP or UDP (User Datagram Protocol) over IP, X.25, Frame Relay, ISDN (Integrated Services Digital Network), PSTN (Public Switched Telephone Network), etc. The devices may alternatively connect directly to the gateway using dial connection. Further, the wireless network may connect to one or more other networks (not shown) in an analogous manner.

In preferred embodiments, portions of the present invention can be implemented in software. Software programming code that embodies the present invention is typically accessed by the microprocessor from long-term storage media of some type, such as a hard drive. The software programming code may be embodied on any of a variety of known media for use with a data processing system such as a hard drive or CD-ROM. The code may be distributed on such media, or may be distributed from the memory or storage of one computer system over a network of some type to other computer systems for use by such other systems. Alternatively, the programming code may be embodied in the memory and accessed by the microprocessor using the bus. The techniques and methods for embodying software programming code in memory, on physical media, and/or distributing software code via networks are well known and will not be further discussed herein.

An implementation of the present invention can be executed in a Web environment, where software installation packages are downloaded using a protocol such as the Hyper-Text Transfer Protocol (HTTP) from a Web server to one or more target computers which are connected through the Internet. Alternatively, an implementation of the present invention may be executed in other non-Web networking environments (using the Internet, a corporate intranet or extranet, or any other network) where software packages are distributed for installation using techniques such as Remote Method Invocation (RMI), OPC or Common Object Request Broker Architecture (CORBA). Configurations for the environment include a client/server network as well as a multi-tier environment. Or, as stated above, the present invention may be used in a stand-alone environment, such as by an installer who wishes to install a software package from a locally-available installation media rather than across a network connection. Furthermore, it may happen that the client and server of a particular installation both reside in the same physical device, in which case a network connection is not required. Thus, a potential target system being interrogated may be the local device on which an implementation of the present invention is implemented. A software developer or software installer who prepares a software package for installation using the present invention may use a network-connected workstation, a stand-alone workstation, or any other similar computing device. These environments and configurations are well known in the art.

As will be understood by those familiar with the art, portions of the invention can be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component or portion of the present invention is implemented as software, the component can be implemented as a script, as a standalone program, as part of a larger program, as a plurality of separate scripts, and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language or for any specific operation system or environment. Accordingly, the disclosure of the present invention is intended to be illustrative but not limiting of the scope of the invention which is set forth in the following claims. While there have been described above the principles of the present invention in conjunction with the electrical distribution grid, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features that are already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A distributed control system for a transmission and distribution power grid wherein the transmission/distribution power grid includes a plurality of distributed energy resources (DER) coupled to a plurality of power consumers, the distributed control system comprising:
an enterprise control module communicatively coupled to existing supervisory control and data acquisition systems for the transmission/distribution power grid and/or other enterprise applications;
a plurality of local control modules wherein each local control module is uniquely associated with one of the plurality of DERs;
a plurality of regional control modules wherein each regional control module is interposed between the enterprise control module and a portion of the plurality of local control modules and wherein the regional control module is operable to perform dynamic power management within a region and power exchange with adjoining regions wherein dynamic power management regulates local and regional power flow parameters to stay within defined operating limits and includes self-altering and/or predictive calculations.

2. The control system of claim 1, wherein the enterprise control module is communicatively coupled to a communication network.

3. The control system of claim 1, wherein a regional control module is interposed between the enterprise control module and another regional control module forming a distributed system.

4. The control system of claim 1, wherein the plurality of DERs is chosen from a group consisting of energy generation, storage and demand/load management.

5. The control system of claim 1 wherein a transmission and distribution power grid DER is chosen from a group consisting of grid and equipment protection, voltage regulation, power flow control, capacitor banks, and transformers.

6. The control system of claim 1, wherein the enterprise control module manages demand among the plurality of regional control modules and power exchange with adjoining power grids or power systems.

7. The control system of claim 6, wherein managing demand among the plurality of regional control modules includes initiating commands to regional control modules to vary power production in a first region in response to varied demand in a second region.

8. The control system of claim 6, wherein managing demand among the plurality of regional control modules includes redefining local control modules associated with each regional control module and regional control modules.

9. The control system of claim 1, wherein the enterprise control module is operable to selectively issue broadcast control commands to the plurality of local control modules and/or regional control modules.

10. The control system of claim 1 wherein responsive to communication disruption the distributed control system is operable to switch to an autonomous operating modality and upon communication restoration synchronize data and revert to a command modality.

11. The control system of claim 1, further comprising a device interface interposed between each local control module and its associated DER wherein the device interface converts standardized local control module commands so as to be understood by the associated DER and converts a DER responses to standardized messages understood by the local control module.

12. The control system of claim 1, wherein the local control module is operable to collect data regarding each coupled DER.

13. The control system of claim 12, wherein data includes static, dynamic or control response characteristics of the DER.

14. The control system of claim 1, wherein the local control module standardizes commands and/or response messages between the DER and the regional control module.

15. The control system of claim 1, wherein management of power production is based on production, load and storage within the region, and/or power exchange with adjoining regions.

16. The control system of claim 1, wherein power production management by the regional control module within each region is autonomous.

17. The control system of claim 1, wherein each of the regional control modules is operable to receive and respond to production commands from the enterprise control module.

18. The control system of claim 17, wherein the regional control module verifies that production commands received from the enterprise control module are within predefined limits of the DERs and the transmission/distribution power grid within the region associated with the regional control module prior to issuing control commands to the DERs.

19. The control system of claim 17, wherein production commands are dynamically verified and preemptively modified so as to maintain actual production within predefined system limits.

20. The control system of claim 1, wherein the enterprise control module and each of the plurality of regional control modules and each of the plurality of local control modules is operable to receive and responds to commands issued from authorized users via a user interface.

21. The control system of claim 1, further comprising a modeling module operable to predict system response and operations to various system conditions.

22. The control system of claim 21, wherein the modeling module can allocate operation of the plurality of DERs and form a set of modeled controls to meet specific power flow objectives.

23. The control system of claim 22, wherein the set of modeled controls can be directly applied to the system.

24. A computer-readable storage medium tangibly embodying a program of instructions executable by a machine wherein said program of instructions comprises a plurality of program codes for managing a transmission/distribution power grid wherein the transmission/distribution power grid includes a plurality of Distributed Energy Resources (DERs) coupled to a plurality of power consumers, said program of instructions comprising:
  program code for dynamically managing at an enterprise control module power flow parameters within the transmission/distribution power grid so as to stay within defined operating limits using self-altering and/or predictive calculations;
  program code for receiving at one or more of a plurality of regional control modules power requests from the enterprise control module wherein each regional control module is associated with a region associated with a portion of the plurality of the DERs; and
  program code for managing at each of the plurality of regional control modules DERs within its associated region.

25. The computer-readable storage medium of claim 24, wherein regional power flow requests are received at the enterprise control module from at least one of the plurality of regional control modules and/or system users.

26. The computer-readable storage medium of claim 25, wherein regional power flow commands are issued by the enterprise control module in response to regional power flow requests received from the at least one of the plurality of regional control modules and/or system users.

27. The computer-readable storage medium of claim 25, wherein local power flow requests are received at the least one of the plurality of regional control modules from at least one of a plurality of local control modules and/or system users.

28. The computer-readable storage medium of claim 25, wherein local power flow commands are issued by the regional control module in response to local power flow requests received from the at least one of the plurality of local control modules and/or system users.

29. The computer-readable storage medium of claim 24, wherein the program code for managing DERs includes program code for standardized control commands issued to DERs via a local control module.

30. The computer-readable storage medium of claim 24, further comprising program code for collecting data regarding each DER.

31. The computer-readable storage medium of claim 24, further comprising program code for initiating commands to one or more of the regional control modules to vary power flow in a first region in response to varied demand in a second region.

32. The computer readable storage medium of claim 24, further comprising program code for initiating commands to one or more of the regional control modules to vary power flow in a region in response to user initiated request.

33. The computer-readable storage medium of claim 24, further comprising program code for redefining DERs associated with each regional control module either automatically or in response to a user initiated request.

34. The computer-readable storage medium of claim 24, further comprising program code for determining DER static and/or dynamic operation based on a predicted or derived power flow.

35. The computer-readable storage medium of claim 24, further comprising program code for real-time analysis of existing connectivity and conditions of the transmission/distribution power grid.

36. The computer-readable storage medium of claim 24, further comprising program code operable to operate a region electrically separated from the transmission/distribution power grid autonomously.

37. The computer-readable storage medium of claim 36, further comprising program code operable to dynamically manage DERs to reincorporate and synchronize operations of an autonomously operating region back into the transmission/distribution power grid.

38. The computer-readable storage medium of claim 24, further comprising program code for modifying connectivity paths among the enterprise control module, the plurality of regional control modules, a plurality of local control modules and the plurality of DERs.

39. A computer system for managing a transmission/distribution power grid wherein the transmission/distribution power grid includes a plurality of Distributed Energy Resources (DERs), the computer system comprising:
  a DER interface for each of the plurality of DERs wherein each DER interface translates implementation specific commands and data:
  a machine capable of executing instructions embodied as software and interfacing with existing supervisory control and data acquisition systems for the transmission/distribution power grid; and
  a plurality of software portions, wherein
    one of said software portions is configured to dynamically manage at an enterprise control module power flow parameters within the transmission/distribution power grid so as to stay within defined operating limits using self-altering and/or predictive calculations:
    one of said software portions is configured to receive at one or more of a plurality of regional control modules power requests from the enterprise control unit wherein each regional control module is associated with a region associated with a portion of the plurality of DERs; and
    one of said software portions is configured to issue, at one or more of the plurality of regional control modules, commands to one or more of the DERs within the associated region of the one or more regional control modules through one of a plurality of local control modules.

40. The computer system of claim 39, further comprising a software portion configured to initiate commands from the enterprise control module to one or more of the regional control modules to modify power flow in a first region in response to flow requests from a second region.

41. The computer system of claim 39, further comprising a software portion configured to predict system response and operations to various system conditions.

* * * * *